United States Patent
Senriuchi et al.

(10) Patent No.: US 8,369,056 B2
(45) Date of Patent: Feb. 5, 2013

(54) POWER SUPPLY CONTROL DEVICE, METHOD FOR CONTROLLING POWER SUPPLY, PROGRAM AND POWER SUPPLY DEVICE

(75) Inventors: Tadao Senriuchi, Tokyo (JP); Masahiko Hirokawa, Tokyo (JP); Takumi Sakamoto, Tokyo (JP); Hiroshi Nakazawa, Tokyo (JP); Noriyuki Hirao, Tokyo (JP)

(73) Assignees: TDK-Lambda Corporation, Tokyo (JP); TDK Corporation, Tokyo (JP)

( * ) Notice: Subject to any disclaimer, the term of this patent is extended or adjusted under 35 U.S.C. 154(b) by 324 days.

(21) Appl. No.: 12/659,951

(22) Filed: Mar. 25, 2010

(65) Prior Publication Data

US 2010/0259856 A1    Oct. 14, 2010

(30) Foreign Application Priority Data

Mar. 27, 2009 (JP) ................................ 2009-079798

(51) Int. Cl.
*H02H 7/00* (2006.01)
(52) U.S. Cl. .................................................... 361/93.1
(58) Field of Classification Search ............ 361/93.1
See application file for complete search history.

(56) References Cited

U.S. PATENT DOCUMENTS 7,042,280 B1 * 5/2006 Huang et al. ................. 327/541
7,859,812 B2 * 12/2010 Chen et al. ................... 361/93.9

FOREIGN PATENT DOCUMENTS

| JP | U-S59-96604 | 6/1984 |
| JP | A-H06-233446 | 8/1994 |
| JP | A-H07-08532 | 1/1995 |
| JP | A-2000-115987 | 4/2000 |

OTHER PUBLICATIONS

Office Action issued Sep. 25, 2012 in corresponding JP Application No. 2009-079798 (and English translation of Examiner's comments).

* cited by examiner

*Primary Examiner* — Stephen W Jackson
(74) *Attorney, Agent, or Firm* — Posz Law Group, PLC

(57) ABSTRACT

A power supply control device for controlling power supply to a pair of terminals to which a load is connected, comprising a voltage measuring part for measuring a voltage which has a predetermined relationship with the voltage of the pair of terminals, a short circuit detecting part for detecting whether a short circuit exists between the pair of terminals based on the measured voltage and for making power supply to the pair of terminals stop when existence of a short circuit is detected, and a constant current supplying part for supplying a constant current though the pair of terminals; wherein the short circuit detecting part is configured to detect that the previously detected short circuit is eliminated when the voltage measured by the voltage measuring part is equal to or greater than a predetermined threshold value upon supplying the constant current through the pair of terminals.

7 Claims, 12 Drawing Sheets

POWER SUPPLY CONTROL DEVICE, METHOD FOR CONTROLLING POWER SUPPLY, PROGRAM AND POWER SUPPLY DEVICE

CROSS-REFERENCE TO RELATED APPLICATION

The present application is related to, claims priority from and incorporates by reference Japanese patent application number 2009-079798, filed on Mar. 27, 2009.

BACKGROUND OF THE INVENTION

1. Field of the Invention

The present invention relates to a power supply control device, power supply control method, program, and power supply device.

2. Description of Related Art

In one example, JP H07-28532 A (patent reference 1) suggests overload protection of a power supply device. In patent reference 1, it is disclosed that an overload protection circuit stops the supply of power at the time of overload of the power supply device. Note that a general cause of an overload condition of the power supply device is when a load is short-circuited.

In the overload protection circuit of patent reference 1, in order to detect whether or not the overload is eliminated, the overload condition of the power supply device is confirmed through periodically restarting the power supply by using a timer. When the overload condition of the power supply device is eliminated, the power supply is restarted.

The overload protection circuit of patent reference 1 confirms the overload condition of the power supply device by periodically restarting the power supply by using a timer. Therefore, confirmation of the overload condition of the power supply device cannot be performed until the occurrence of the periodic time that is set by the timer. In other words, even when the overload condition of the power supply device is eliminated between the periodic times that are set by the timer, the overload protection circuit of patent reference 1 cannot detect that the overload is eliminated.

Subsequently, with the overload protection circuit of patent reference 1, even though the overload condition of the power supply device has already been eliminated, a state in which restarting of the power supply is delayed occurs because the periodic time of the timer period has not yet occurred. This type of state does not satisfy a user who desires to restart the power supply as soon as possible.

SUMMARY OF THE INVENTION

The present invention is made in view of the above background. An object of the present invention is to provide a power supply control device, power supply control method, program, and power supply device that can restart the power supply immediately after the overload condition of the power supply device is eliminated.

According to the first aspect of the invention, it is provided a power supply control device comprising: a short circuit detecting part that determines a short circuit condition of an output side by measuring voltage of a circuit connected in parallel to the output side and having a diode; and a constant current supplying part that supplies constant current in a forward bias direction of the diode of the circuit connected in parallel to the output side and having the diode, wherein the short circuit detecting part determines that the short circuit condition of the output side is eliminated when the voltage of the circuit connected in parallel to the output side and having the diode, that receives the supplied constant current from the constant current supplying part, greater than or equal to a predetermined threshold value.

According to the second aspect of the invention, it is provided a power supply device comprising: the power supply control device of the present invention; a battery; and a switch that shuts off or connects an output of the battery based on control of the power supply control device, wherein the switch stops the output of the battery when the power supply control device detects the short circuit of the output side, and restores the output of the battery when the power supply control device detects that the short circuit of the output side is eliminated.

According to the third aspect of the invention, it is provided a method for controlling power supply having a short circuit detecting step that determines a circuit condition of an output side by measuring a voltage of a circuit connected in parallel with the output side and having a diode, comprising: a constant current supply step that supplies a constant current in a forward bias direction of the diode of the circuit connected in parallel to the output side and having the diode; and a determination step to determine whether or not a short circuit of the output side is eliminated when the voltage of the circuit connected in parallel to the output side and having the diode, that receives the supplied constant current by a processing of the short circuit detecting step, is equal to or more than the predetermined threshold value.

According to the fourth aspect of the invention, it is provided a computer program wherein an information processing device executes the power supply control method according to the present invention by installing it to the information processing device.

According to the present invention, the power supply can be restarted immediately after the overload condition of the power supply device is eliminated.

DETAILED DESCRIPTION OF THE PREFERRED EMBODIMENTS

Figure 1:
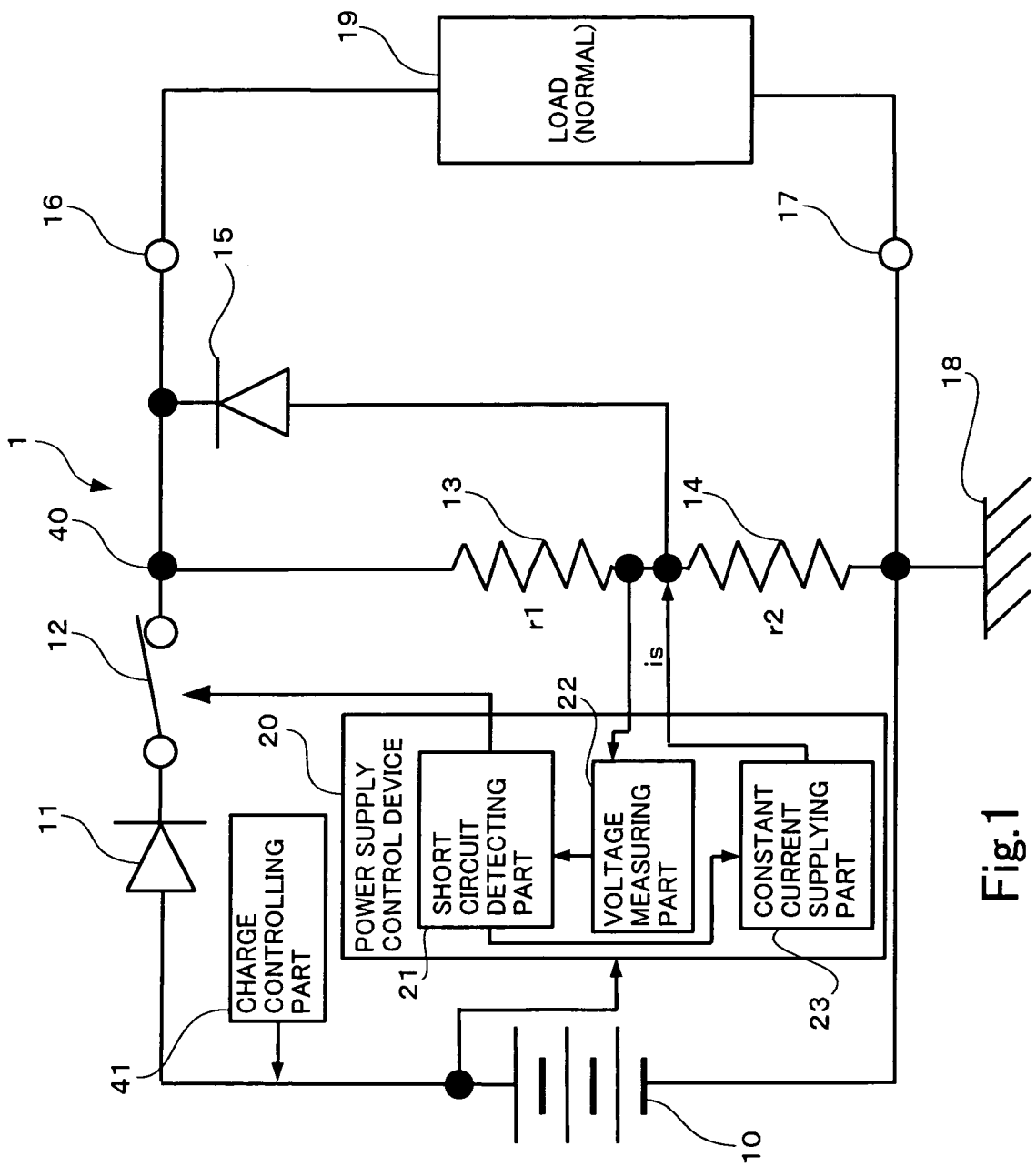
FIG. 1 is a schematic view of main structures of a power supply device according to a first embodiment of the present invention.

Main Structures of Power Supply Device 1
According to First Embodiment of Present Invention Main structures of a power supply device 1 according to a first embodiment are explained with reference to FIG. 1. FIG. 1 is a schematic view of the main structures of the power supply device 1. As shown in FIG. 1, the power supply device 1 is configured with a battery 10, a diode 11, a switch 12, a resistor 13, a resistor 14, a diode 15, a terminal 16, a terminal 17, ground connection 18, and a power supply control device 20. The power supply control device 20 is configured with a short circuit detecting part 21, a voltage measuring part 22, and a constant current supplying part 23. A load 19 is connected to the power supply device 1 via the terminals 16 and 17. And, the power supply device 1 also has a charge controlling part 41 in order to charge the battery 10; however, the explanation thereof is omitted because there is no direct relationship with the explanation below. Note that description and usage of the units, ohm (Ω), volt (V) and ampere (A) are omitted for a resistance value, voltage value, and current value, respectively, in the explanation below.

The battery 10 is a direct-current [DC] power supply and is, for example, a lithium-ion battery. The diode 11 is a member to prevent reverse current to the battery 10. The switch 12 is a member that turns ON (start) or OFF (stop) the power supply to the load 19 by the battery 10. The resistors 13 and 14 are members that generate voltage by a portion of the current that is provided from the battery 10 to branch and flow to the load 9 at a branch point 40 when the switch 12 is in an ON state. The diode 15 is a member to prevent the reverse current from the side of the terminal 16 to the side of the power supply control device 20.

The diode 15 has a role to enable constant current "is" to flow to the side of the terminal 16 when the constant current supplying part 23 supplies constant current to the output side because the resistance value r1 of the resistor 13 is set at a large value.

The terminal 16 and the terminal 17 are members to which the load 19 is connected. The ground connection 18 is a member to provide ground potential to the power supply device 1. The load 19 is generally equipment that is driven by the battery 10. Here, a case in which a short circuit occurs between the terminal 16 and the terminal 17 by the load 19 means that, for example, a user accidentally contacts metal, such as an edge of a screw driver, to the terminals 16 and 17 that are connected to the load 19. Alternatively, a user could accidentally connect the conductive wires together that are for connecting the terminals 16 and 17 and the load 19.

The power supply control device 20 is a member to control the switch 12 when the short circuit is detected or the elimination of the short circuit of the load 19 is detected. The short circuit detecting part 21 of the power supply control device 20 is a member to detect existence or nonexistence of the short circuit of the load 19. The voltage measuring part 22 of the power supply control device 20 is a member to measure voltage that occurs across the resistors 13 and 14. The constant current supplying part 23 is a member to supply constant current to a connecting part of the resistors 13 and 14. Accordingly, constant current is supplied in a forward bias direction of the diode 15 by the constant current supplying part 23.

[Regarding Operation Principle of Power Supply Control Device 20]

Next, an operation principle of the power supply control device 20 is explained with reference to FIGS. 1-8. First of all, the operation principle for which the power supply control device 20 detects a short circuit is explained with reference to FIGS. 2-4. The resistance value of the resistor 13 is r1, and the resistance value of the resistor 14 is r2. Hereafter, it is explained as "r1+r2=R." At this time, it is preferred that the sum R of the resistance value r1 of the resistor 13 and the resistance value r2 of the resistor 14 is set as an extremely large value compared to an internal resistance value rL of the load 19 (rL<<R). In other words, when the power is supplied to the load 19 from the battery 10, the current that is branched to the resistors 13 and 14 from the branch point 40 is not used to drive the load 19. Therefore, it is preferred that the branched current to the resistors 13 and 14 is extremely small compared to the current that flows toward the load 19. On the other hand, a voltage value which can be measured by the voltage measuring part 22 is determined to be a predetermined value due to the design of the voltage measuring part 22. Therefore, the resistance value r2 of the resistor 14 is set to be a voltage value that is measurable by the voltage measuring part 22.

Accordingly, the measurable voltage value for the voltage measuring part 22 is realized by adjusting the resistance value of the resistor 14 because a voltage-dividing circuit configured with the two resistors 13 and 14 is used as discussed above. Because the resistance value of the resistor 13 is also adjusted in addition to the reasons described above, the sum R of the resistance values of the resistors 13 and 14 can be the desired large resistance value.

The voltage measuring part 22 is displayed by the symbol representing a direct current voltmeter. Moreover, in FIGS. 2, 3, 5, 6, and 7, the diode 11 that does not have a direct relationship with the explanation for the operation principle is omitted in the figures.

Figure 2:
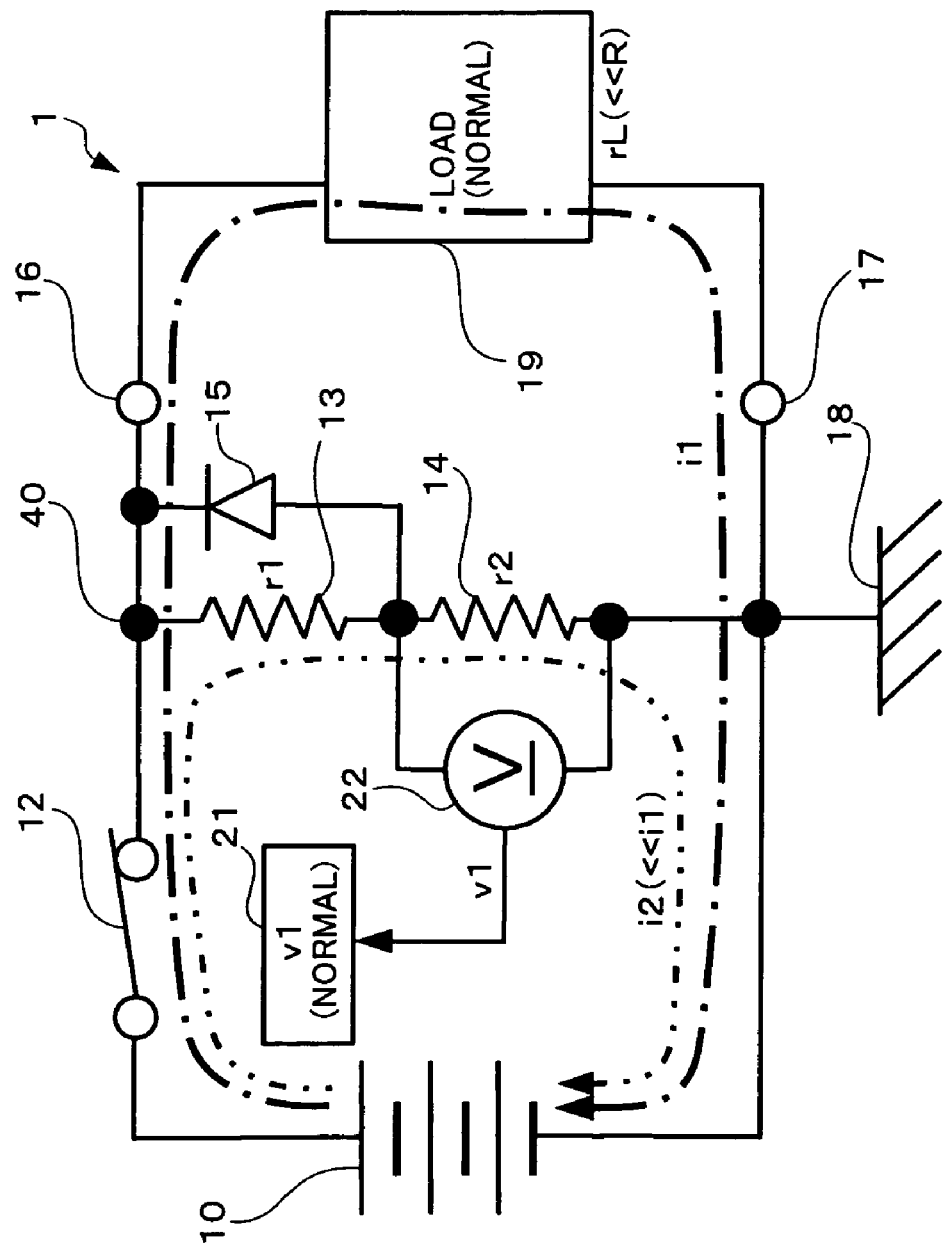
FIG. 2 is a schematic view for explaining an operation principle of a power supply control device shown in FIG. 1 and showing a case in which a load is normal.

Condition 1: When the load 19 is normal (FIG. 2): The battery 10 supplies power to the load 19 via the switch 12, the terminal 16, and the terminal 17. In this case, as shown in FIG. 2, a portion of the current i1 (chain lines) that flows in the load 19 by the branch point 40 is branched, and the current (double chain lines) with a current value i2 flows in the side of the resistors 13 and 14. A voltage value of "i2×r2=v1" occurs at the connecting point of the resistors 13 and 14 by the current with the current value i2. Accordingly, the voltage measuring part 22 outputs the voltage value v1 to the short circuit detecting part 21. At this time, because the internal resistance value rL of the load 19 becomes an extremely small resistance value (rL<<R) compared to the resistance value R of the resistors 13 and 14, the current value i2 becomes an extremely small current value (i2<<i1) compared to the current value i1.

Figure 3:
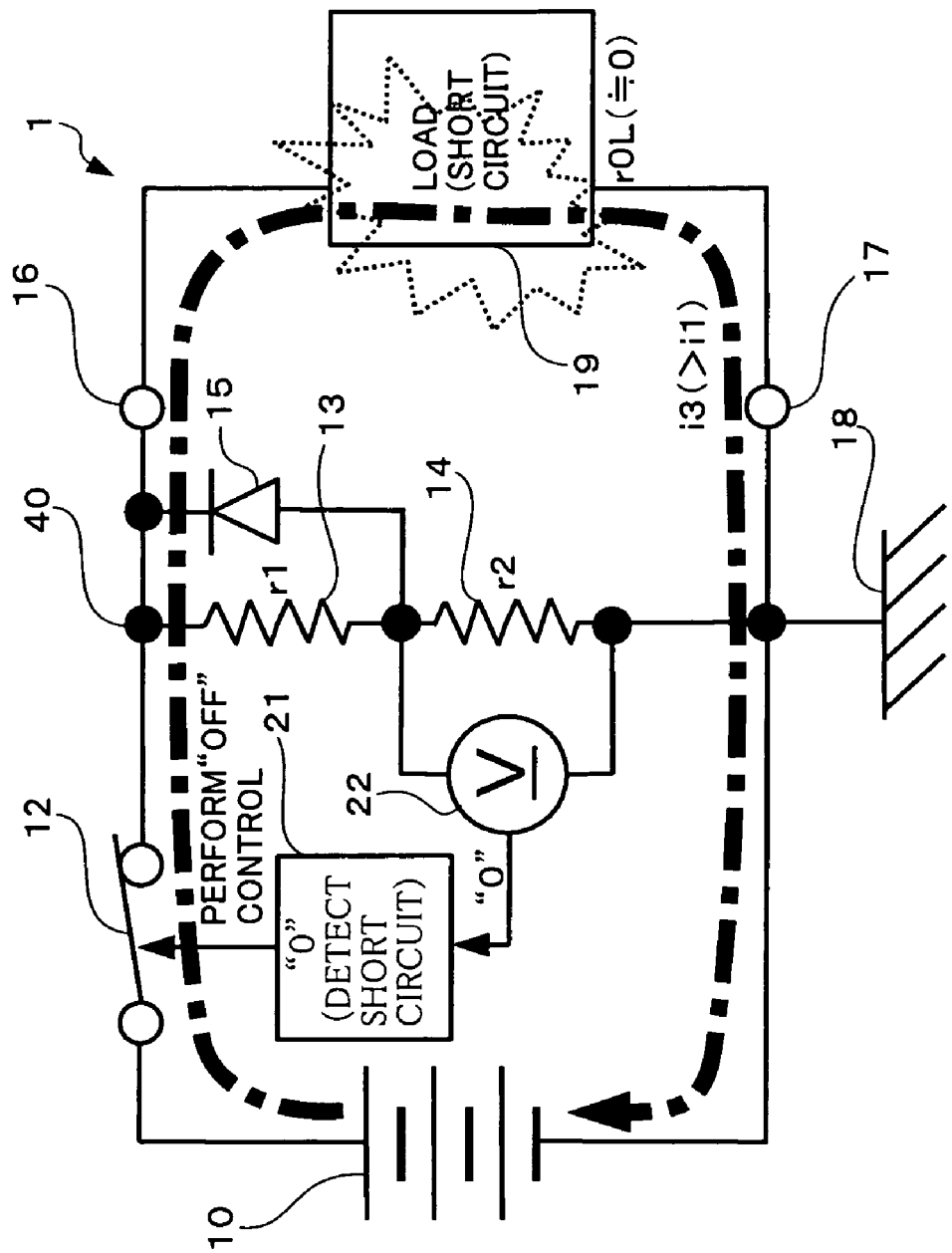
FIG. 3 is a schematic view for explaining an operation principle of a power supply control device shown in FIG. 1 and showing a case in which a short circuit occurs at a load.

Condition 2: When a short circuit occurs across the load 19 (FIG. 3): When the short circuit occurs across the load 19, as shown in FIG. 3, a resistance value r0L of the load 19 becomes almost "0" (r0L≈0). Accordingly, the current value i3 that flows in the load 19 increases compared to the current value i1 shown in FIG. 2 (i3>i1). On the other hand, because a voltage in the middle of the voltage-dividing circuit configured with the resistors 13 and 14 becomes almost negligible, the voltage measuring part 22 outputs a voltage value "0" to the short circuit detecting part 21.

Figure 4:
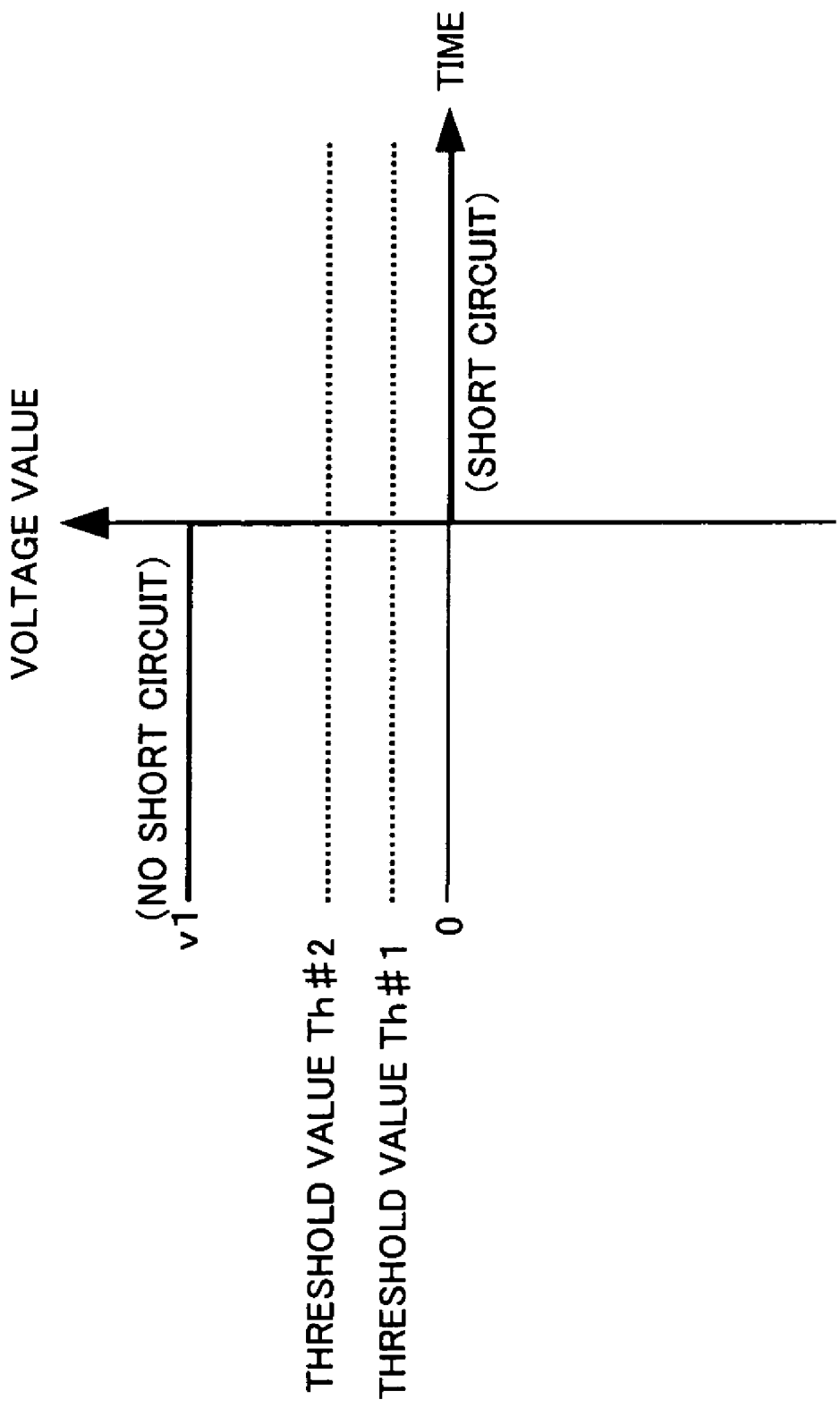
FIG. 4 is a diagram for explaining a relationship between existence or nonexistence of a short circuit and a voltage value that is measured by a voltage measuring part shown in FIGS. 2 and 3.

Here, the short circuit detecting part 21, as shown in FIG. 4, can detect that the short circuit has occurred across the load 19 because the short circuit detecting part 21 detects that the voltage value v1 measured by the voltage measuring part 22 becomes "0," which is equal to or less than a threshold value Th#1. Accordingly, the short circuit detecting part 21 can detect existence or nonexistence of the short circuit of the load 19 based on the voltage value measured by the voltage measuring part 22. As a result, the short circuit detecting part 21 controls the switch 12 to be in the "OFF" condition. The principles of this short circuit detection and operation to make the switch 12 in the "OFF" condition are the same as a conventional short circuit detecting method. The switch 12 has a switch driving mechanism, which is not shown in figure, that turns the switch ON or OFF by an instruction from the power supply control device 20. A threshold value Th#2 is explained later. This threshold value Th#2 corresponds to a predetermined threshold value discussed in the claims.

Figure 5:
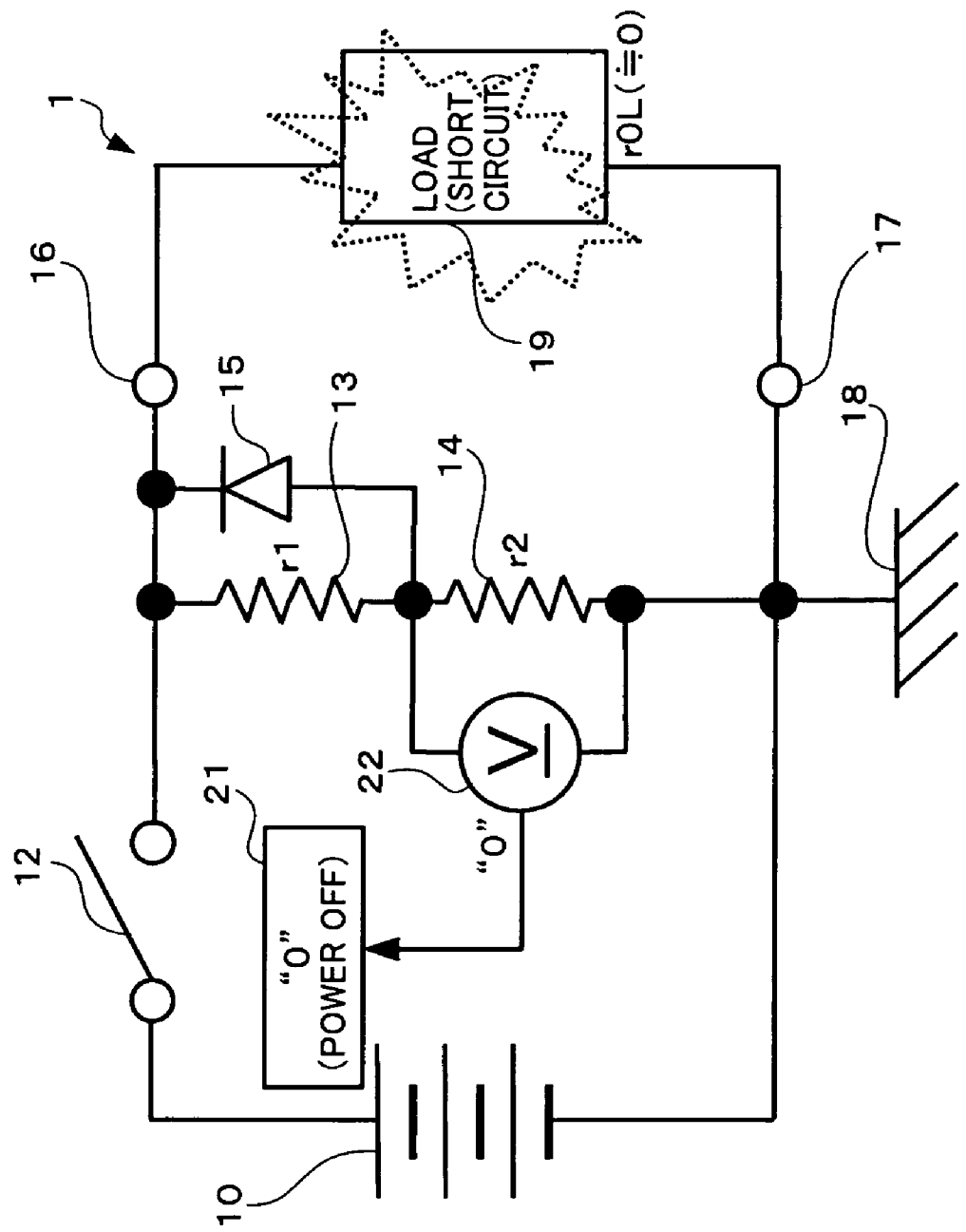
FIG. 5 is a schematic view for explaining an operation principle of a power supply control device shown in FIG. 1 and illustrating a case in which a switch is turned off due to a short circuit.

Condition 3: When the switch 12 is in the "OFF" condition due to the short circuit (FIG. 5): When the short circuit detecting part 21 detects the short circuit that occurs across the load 19, as shown in FIG. 3, the switch 12 is controlled to be in the "OFF" condition. Accordingly, as shown in FIG. 5, the power supply device 1 stops the supply of power to the load 19. At this time, the voltage measuring part 22 outputs a voltage value "0" to the short circuit detecting part 21.

Figure 6:
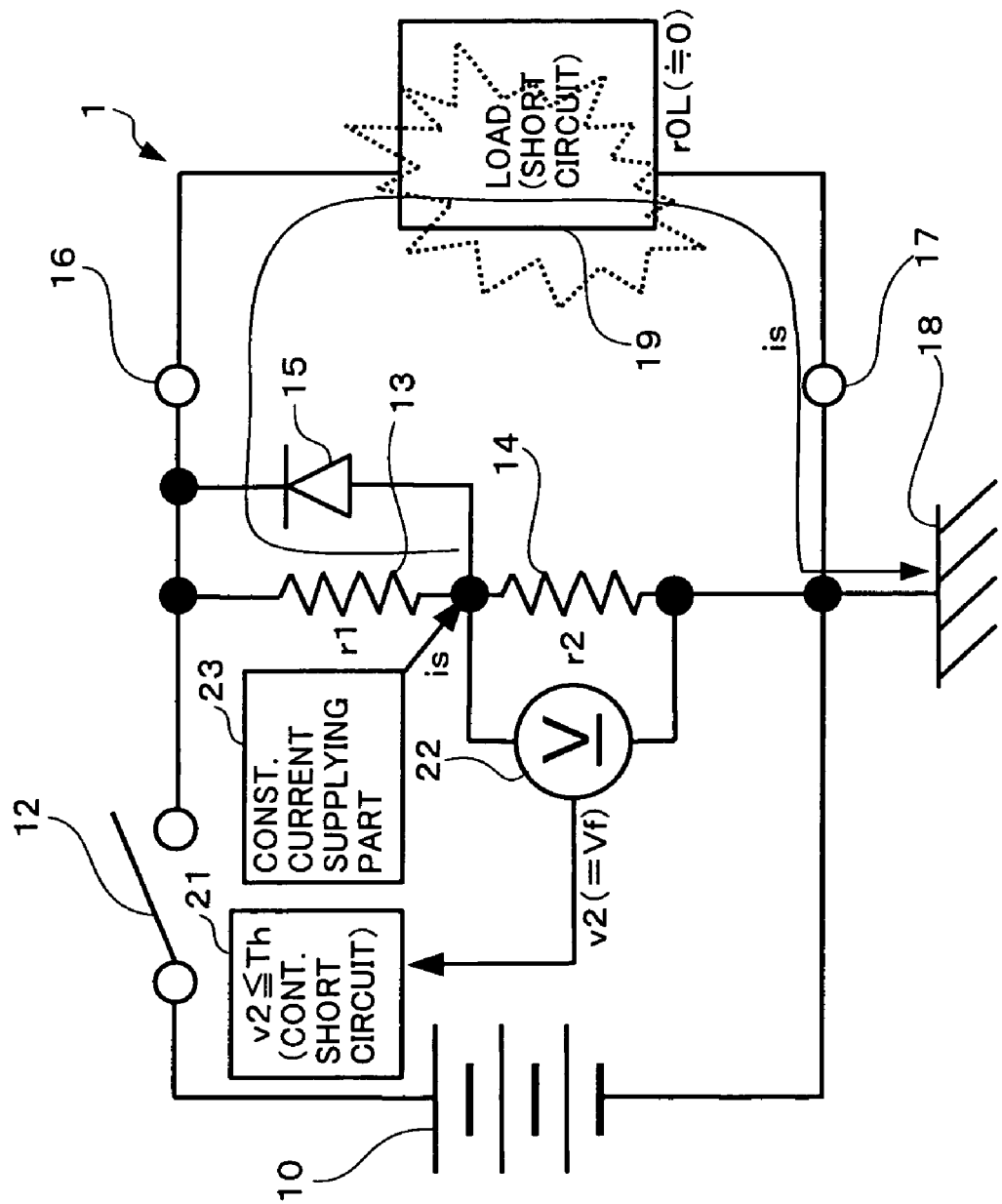
FIG. 6 is a schematic view for explaining an operation principle of a power supply control device shown in FIG. 1 and showing a case in which a short circuit elimination of a load is measured.

Condition 4: When the elimination of the short circuit of the load 19 is detected (FIG. 6): When the short circuit occurs across the load 19, and when the switch 12 becomes in the "OFF" condition as shown in FIG. 5, the constant current supplying part 23 starts supplying constant current of a current value "is" to the connecting point between the resistor 13 and the resistor 14 as shown in FIG. 6. Accordingly, the constant current supplying part 23 supplies the constant current in a forward bias direction of the diode 15. This current value "is" is, for example, an extremely small current value, such as 10 μA. Because the resistance value r1 of the resistor 13 is set as sufficiently larger than the internal resistance value of the diode 15, the constant current of the current value "is" flows to the ground connection 18 via the diode 15, the terminal 16, the load 19, and the terminal 17. Due to the constant current of the current value "is", a voltage value, "is×(internal resistance of the diode 15)=v2," occurs at the diode 15. It is preferred that the resistance value r1 of the resistor 13 is a few thousand times more than the internal resistance value of the diode 15. Accordingly, the voltage measuring part 22 outputs the voltage value v2 to the short circuit detecting part 21. And, the voltage value v2 corresponds to the forward direction voltage drop (Vf) of the diode 15.

Figure 7:
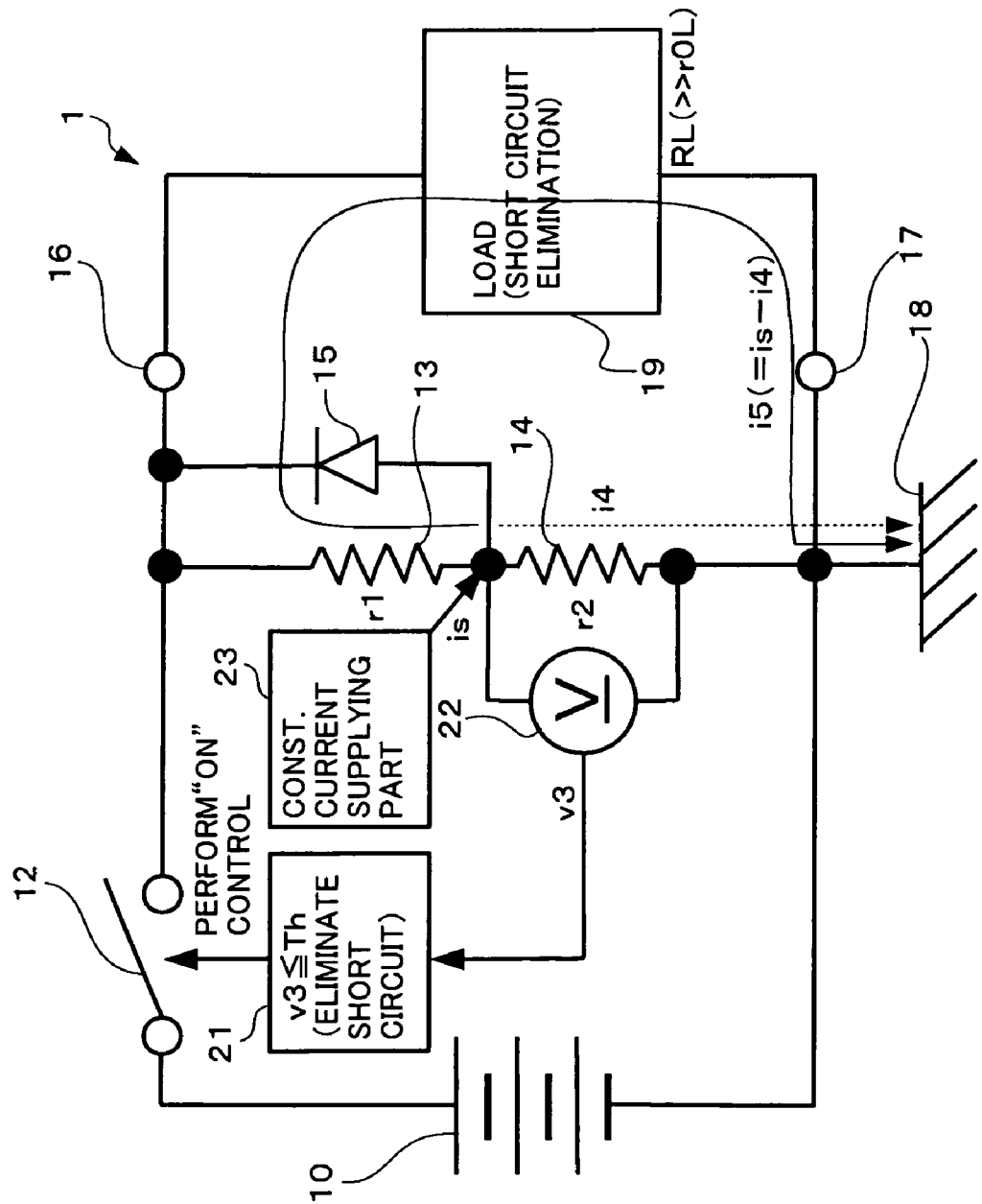
FIG. 7 is a schematic view for explaining an operation principle of a power supply control device shown in FIG. 1 and showing a case in which short circuit of a load is eliminated.

Condition 5: When the short circuit of the load 19 is eliminated (FIG. 7): When the short circuit that occurs across the load 19 is eliminated, as shown in FIG. 7, the load 19 returns to the normal resistance value rL, or the load 19 becomes connected. Because the resistance value r0L≈0, rL>>r0L. Accordingly, current with a current value i4 flows in the resistor 14. Then, a voltage value, "i4×r2=v3," occurs at the resistor 14. The current of the current value i4 that flows in the resistor 14 is equal to the constant current of the current value "is" when an output side is in an open condition. Therefore, the voltage measuring part 22 outputs the voltage value v3 to the short circuit detecting part 21. In FIG. 7, a current value i5 that flows in the load 19 becomes i5=(is−i4).

Figure 8:
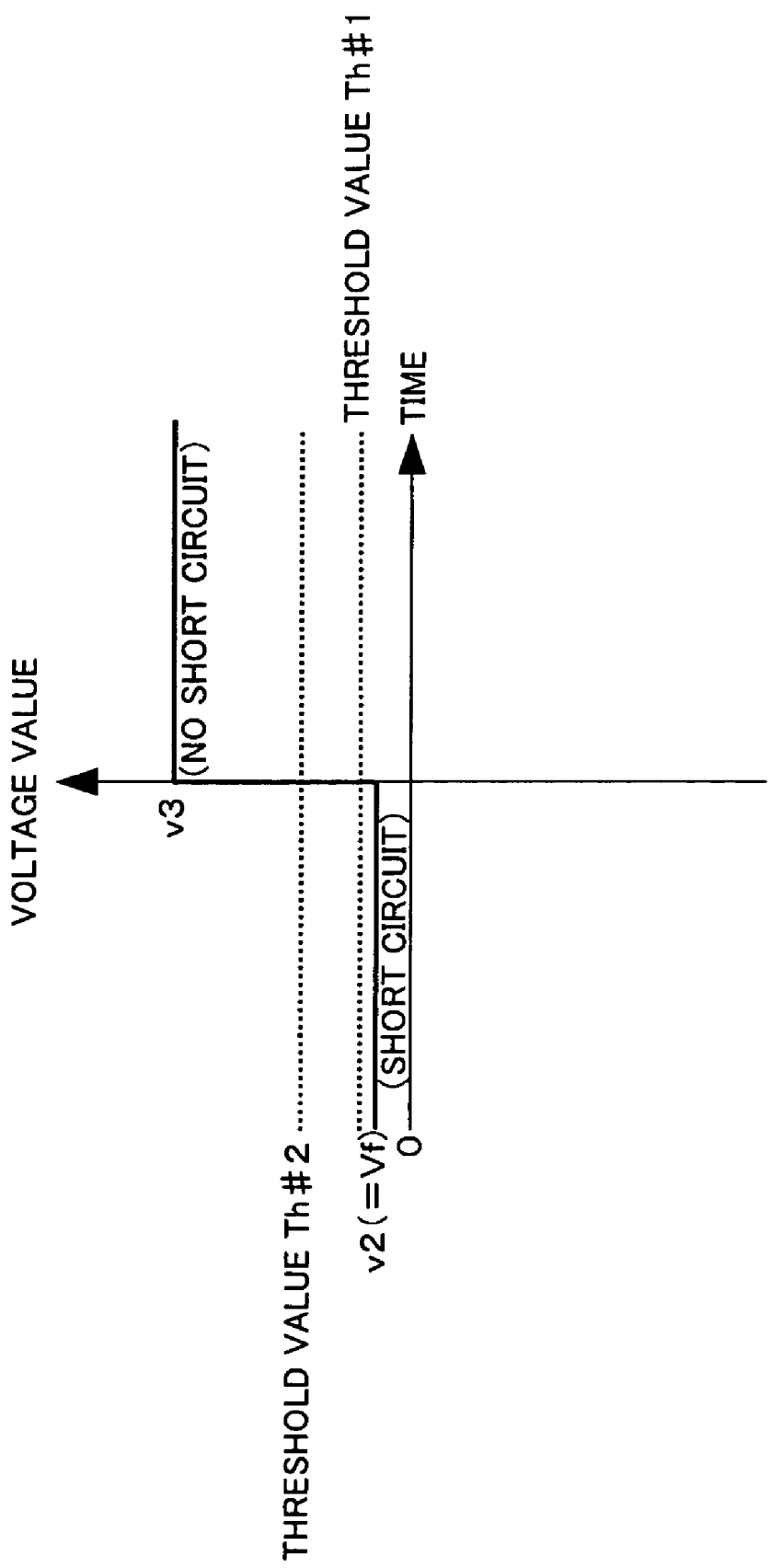
FIG. 8 is a diagram for explaining a relationship between existence or nonexistence of a short circuit and a voltage value that is measured by a voltage measuring part shown in FIGS. 6 and 7.

Here, in the short circuit detecting part 21, as shown in FIG. 8, the threshold value Th#2 is set. The threshold value Th#2 is set as "v2≦Th#2" when the load 19 is short-circuited. And, when the short circuit of the load 19 is eliminated, the threshold value Th#2 is set as "v3>Th#2." Further, the value is higher compared to the threshold value Th#1 that is explained in FIG. 4. In other words, the threshold value Th#1 that is explained in FIG. 4 is appropriate when it is higher than a voltage value "0." In contrast, the threshold value Th#2 of FIG. 8 must be higher than the voltage value v2 (=Vf).

As discussed above, the short circuit detecting part 21 can detect the elimination of the short circuit of the load 19 based on a voltage value that is measured by the voltage measuring part 22. The short circuit detecting part 21 that detects the elimination of the short circuit of the load 19 controls to change the switch 12 to be in the "ON" condition. Accordingly, the power supply device 1 returns to the condition shown in FIG. 2 again. And, at this time, the constant current with the current value "is" supplied by the constant current supplying part 23 is stopped.

Accordingly, the power supply control device 20 can perform the ON/OFF control for the switch 12 by detecting the occurrence of the short circuit and the elimination of the short circuit of the load 19.

An order of operation of the power supply control device 20 described above is shown in a flow diagram of FIG. 9.

START: The power supply control device 20 shifts to the processing of S1 when the power supply device 1 starts to operate. The term, "the power supply device 1 starts to operate," means that the activation switch (not shown) of the power supply device 1 is in the "ON" condition. Or it means that the battery 10 is mounted on the power supply device 1.

S1: The short circuit detecting part 21 determines whether or not a voltage value that is measured by the voltage measuring part 22 is equal to or less than the threshold value Th#1. The short circuit detecting part 21 repeats the processing of S1 when the voltage value that is output from the voltage measuring part 22 is v1, which is higher than the threshold value Th#1 that determines whether or not the short circuit occurs (NO at S1). On the other hand, the short circuit detecting part 21 shifts to the processing of S2 when a voltage value that is output from the voltage measuring part 22 is "0," which is equal to or less than the threshold value Th#1 (YES at S1).

S2: The short circuit detecting part 21 controls the switch 12 to be in the "OFF" condition when the short circuit detecting part 21 determines that the load 19 is in the short circuit condition, and then shifts to the processing of S3.

S3: The short circuit detecting part 21 instructs the constant current supplying part 23 to start the constant current supply and shifts to the processing of S4.

S4: The constant current detecting part 21 determines whether or not a voltage value that is output from the voltage measuring part 22 is equal to or more than the threshold value Th#2. The short circuit detecting part 21 repeats the processing of S4 when the voltage value that is output from the voltage measuring part 22 is less than the threshold value Th#2 (NO at S4). On the other hand, the short circuit detecting part 21 shifts to the processing of S5 when the voltage value that is output from the voltage measuring part 22 is equal to or more than the threshold value Th#2 (YES at S4).

S5: The short circuit detecting part 21 controls the switch 12 to be in the "ON" condition by determining that the short circuit condition of the load 19 is eliminated. And, the short circuit detecting part 21 also instructs the constant current supplying part 23 to stop the constant current supply and return to the processing of S1.

Figure 10:
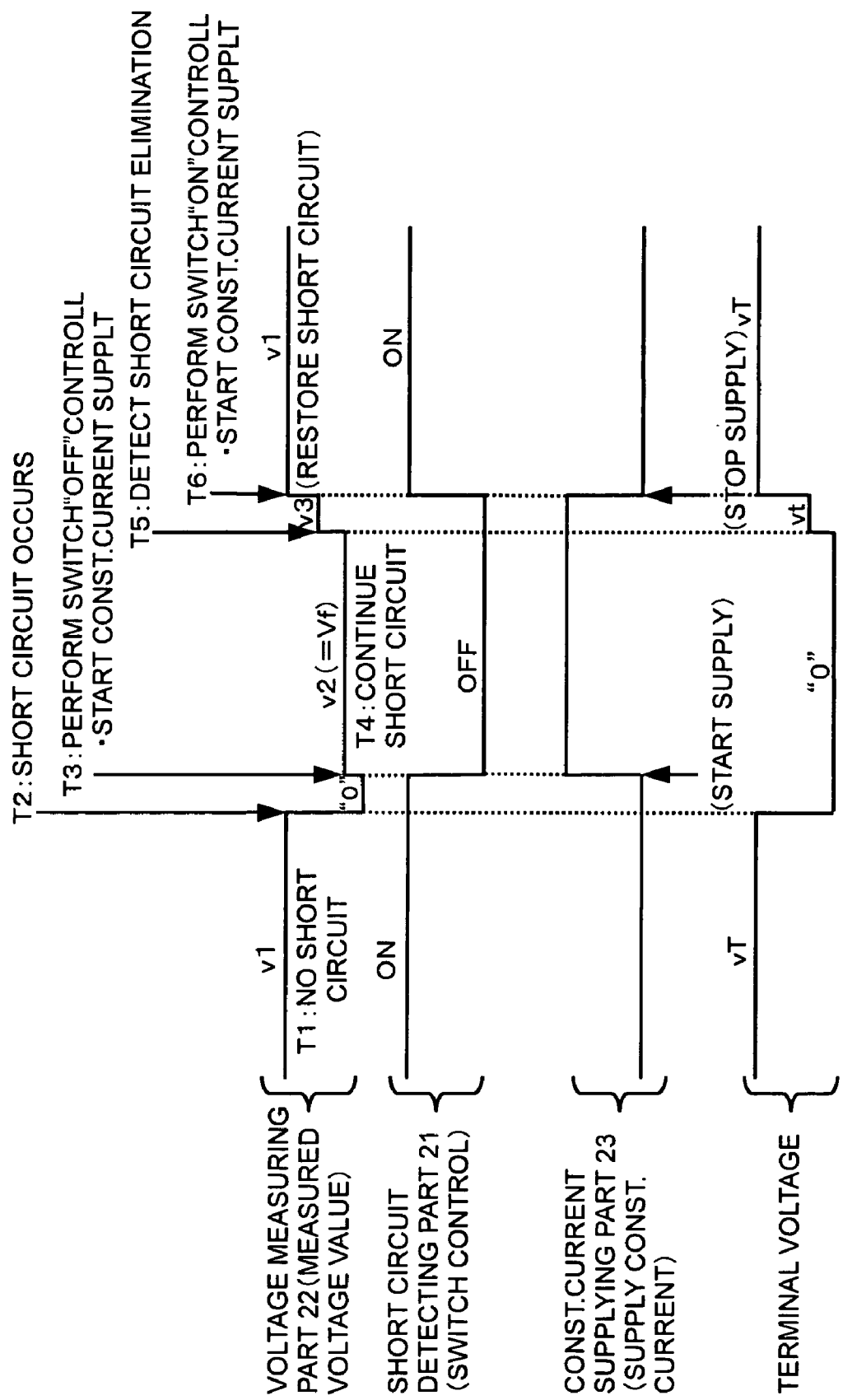
FIG. 10 is a timing chart for showing operation of a power supply control device shown in FIG. 1.

Subsequently, operation of the power supply control device 20 is shown in FIG. 10 as a timing chart. In FIG. 10, a measured voltage value measured by the voltage measuring part 22, switch control performed by the short circuit detecting part 21, and constant current supply performed by the constant current supplying part 23 are described. Moreover, as a reference, a terminal voltage of the terminals 16 and 17 is also described.

T1: No Short Circuit: The voltage measuring part 22 outputs the voltage value v1. At this time, because the short circuit detecting part 21 does not detect a short circuit, the switch 12 is in the "ON" condition. Also, the short circuit detecting part 21 does not instruct the constant current supplying part 23 to provide a constant current supply. Further, a voltage value of the terminals 16 and 17 is vT.

T2: Short Circuit Occurs: The voltage measuring part 22 outputs the voltage value "0." The short circuit detecting part 21 detects the short circuit because the voltage value "0," which is lower than the threshold value Th#1, is output from the voltage measuring part 22. Here, when the short circuit condition is determined, it is preferred that time shifting the switch 12 in the "OFF" condition is fast because it is necessary to protect the battery (power supply) 10. For example, it is preferred that the time shifting of the switch 12 in the "OFF" condition is equal to or less than 500 microseconds (hereafter, μsec). At this time, at the short circuit detecting part 21, a short monitoring time is provided because an instantaneous short circuit which has no influence on the battery 10 should be ignored. The monitoring time is, for example, 250 μsec. Also, the voltage value of the terminals 16 and 17 becomes "0." As a result, it is preferred that the time shifting the switch 12 in the "OFF" condition is, for example, equal to or less than 250 μsec-500 μsec.

T3: Perform Switch "OFF" Control, Start Constant Current Supply: The short circuit detecting part 21 controls the switch 12 in the "OFF" condition when the monitoring time has elapsed (for example, 250 μsec). The short circuit detecting part 21 controls the switch 12 in the "OFF" condition and instructs the constant current supplying part 23 to supply constant current. The constant current supplying part 23 starts supplying the constant current after the constant current supplying part 23 receives an instruction from the short circuit detecting part 21. And, the voltage value of the terminals 16 and 17 at this time remains "0."

T4: Short Circuit Continues: In the condition in which the short circuit of the load 19 continues, at the diode 15, the voltage value v2 that is equivalent to the forward direction voltage drop Vf of the diode 15 continues to occur due to the constant current that is supplied by the constant current supplying part 23 in the forward bias direction of the diode 15. The voltage measuring part 22 outputs the voltage value v2 to the short circuit detecting part 21. When the short circuit detecting part 21 compares the voltage value v2 from the voltage measuring part 22 with the threshold value Th#2, the short circuit detecting part 21 determines that the short circuit is not eliminated because the voltage value v2 is less than the threshold value Th#2. The voltage value of the terminals 16 and 17 at this time remains as "0."

T5: Detect Short Circuit Elimination: When the short circuit of the load 19 is eliminated, the constant current that is provided by the constant current providing part 23 flows in the side of the resistor 14. Accordingly, the voltage measuring part 22 outputs the voltage value v3 that is equal to or more than the threshold value Th#2 to the short circuit detecting part 21. When the short circuit detecting part 21 compares the voltage value v3 with the threshold value Th#2, the short circuit detecting part 21 detects the short circuit elimination because the voltage value v3 (V) is equal to or more than Th#2. At this time, at the short circuit detecting part 21, a short monitoring time is provided because an instantaneous short circuit elimination should be ignored. This monitoring time is, for example, 250 microseconds (hereafter, μsec). The voltage value vt of the terminals 16 and 17 becomes "(i5×rL)."

T6: Perform Switch "ON" Control, Stop Constant Current Supply: The short circuit detecting part 21 not only controls the switch 12 in the "ON" condition, but also instructs the constant current supplying part 23 to stop the constant current supply when the monitoring time (for example 250 μsec) has elapsed. The constant current supplying part 23 stops supplying the constant current when the constant current supplying part 23 receives instructions for stopping the constant current supply from the short circuit detecting part 21.

Accordingly, the power supply device 1 can immediately restart the power supply to the load 19 when the short circuit of the load 19 is eliminated. This satisfies a request for a user who wishes to restart the power supply as fast as possible. And, as shown in the overload protection circuit described in patent reference 1, when the elimination of the short circuit is determined by periodically returning the switch 12 in the "ON" condition, a large amount of current flows from the battery 10 for a short period of time in the case in which the short circuit is not eliminated. This will cause the capacity of the battery 10 to be rapidly lowered. As the power supply device 1 detects the elimination of the short circuit by a small amount of constant current (for example 10 μA), the capacity of the battery 10 lowered by the short circuit detection can be avoided.

Figure 11:
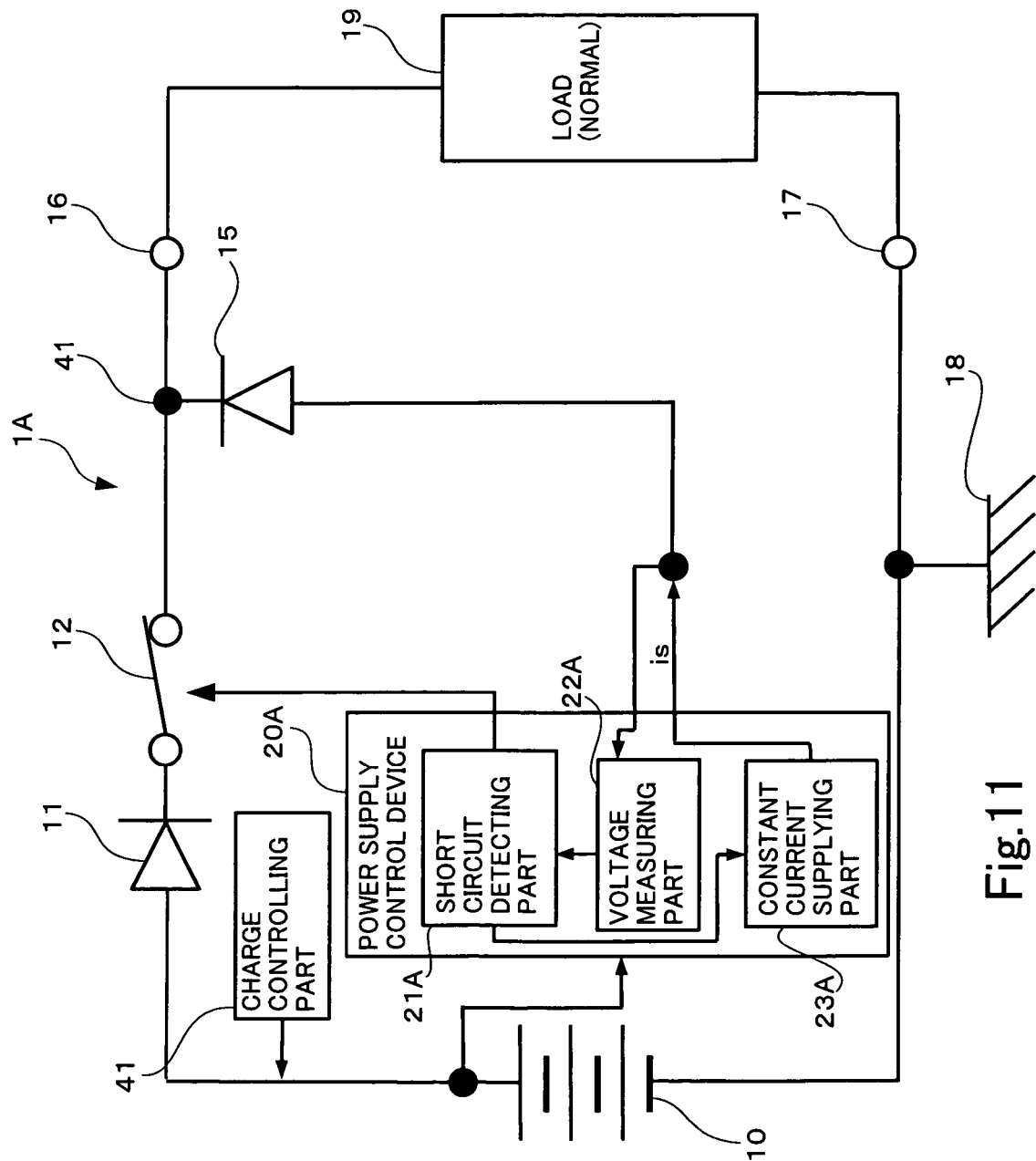
FIG. 11 is a schematic view of main structures of a power supply device according to a second embodiment of the present invention.

Regarding Main Structures of Power Supply Device 1A of Second Embodiment of Present Invention The main structures of a power supply device 1A of a second embodiment are explained with reference to FIG. 11. FIG. 11 shows a diagram of the main structures of a power supply device 1A. The part of the structure of the power supply device 1A is different from the power supply device 1. Hereafter, same or similar types of numbers are used for the members that are the same or of the same type as the first embodiment, and the explanation thereof is omitted or simplified, and only different members are primarily, explained.

The power supply device 1A does not have the resistor 13 and the resistor 14 that exist in the power supply device 1. The power supply device 1A has a power supply control device 20A. The power supply control device 20A has a short circuit detecting part 21A, a voltage measuring part 22A, and a constant current supplying part 23A.

The processing and operation of the short circuit detecting part 21A are same as the short circuit detecting part 21 of the first embodiment.

The constant current supplying part 23A continuously supplies the constant current of a current value "is" in the forward bias direction of the diode 15 during operation of the power supply device 1A. Accordingly, the power measuring part 22A measures a voltage value that occurs by internal resistance of the diode 15 and the load 19, and constant current of the current value "is" that is supplied in the forward bias direction of the diode 15 by the constant current supplying part 23A.

[Regarding Principle of Power Supply Control Device 20A]

Subsequently, an operation principle of the power supply control device 20A is explained with reference to FIG. 12. When the load 19 is normal (no short circuit) (T1 of FIG. 12), the voltage measuring part 22A measures the voltage value v1A that occurs by the internal resistance of the diode 15 and the load 19, and the constant current of the current value "is" that is supplied in the forward bias direction of the diode 15 by the constant current supplying part 23A.

A measurement result of the voltage measuring part 22A is outputted to the short circuit detecting part 21A. The short circuit detecting part 21A determines that the load 19 is normal (no short circuit) when the measurement result of the voltage measuring part 22A is the voltage value v1A.

Here, when a short circuit occurs across the load 19 (T2 of FIG. 12), the side of the diode 15 at the branch 41 reaches the same potential as the ground connection 18. Accordingly, the voltage value that is measured by the voltage measuring part 22A becomes the voltage value v2, which corresponds to the forward direction voltage drop Vf of the diode 15 that occurs by the internal resistance of the diode 15 and the constant current that is provided by the constant current supplying part 23A with respect to the forward bias direction of the diode 15.

Figure 12:
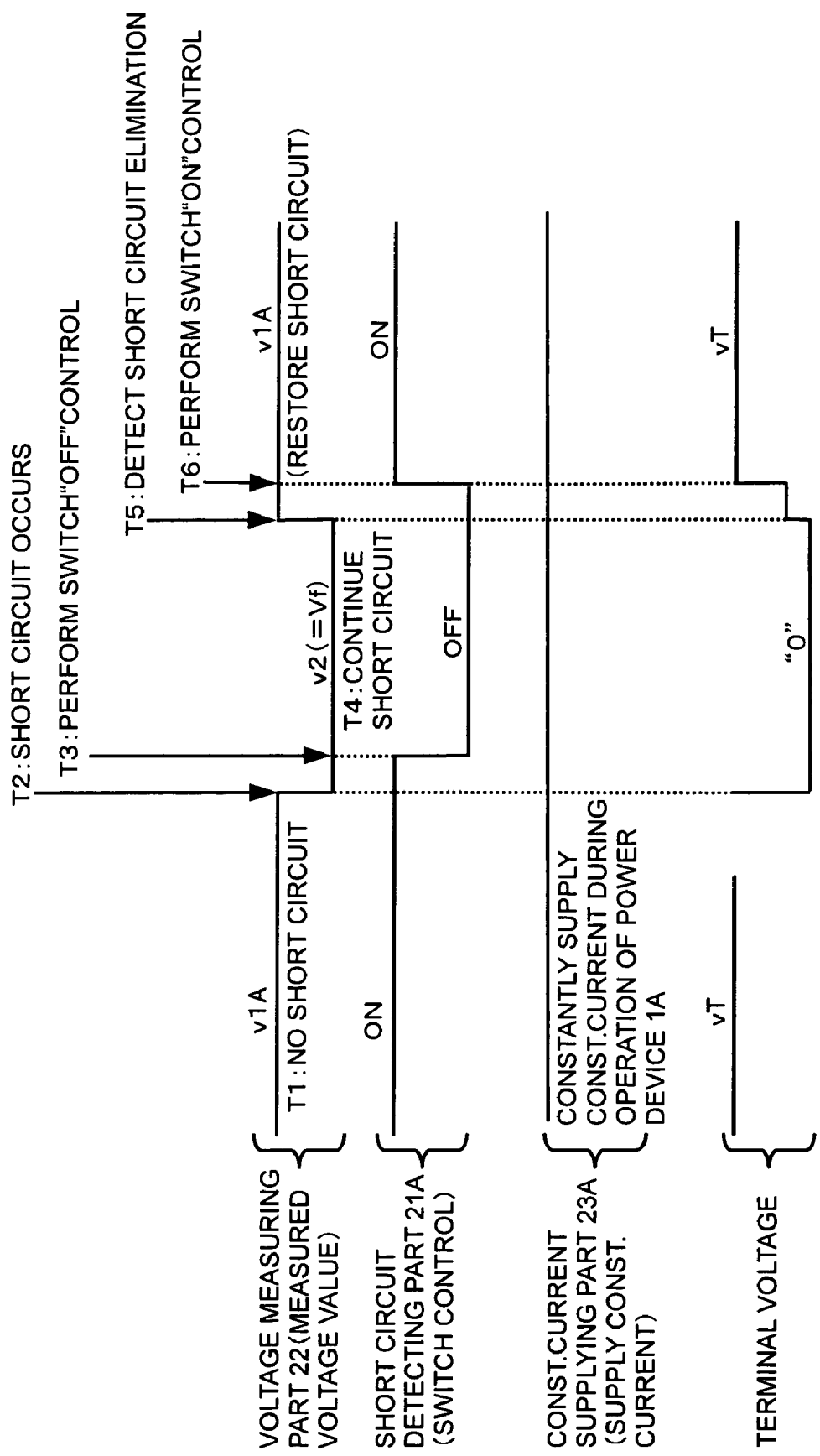
FIG. 12 is a timing chart for showing operation of a power supply control device shown in FIG. 11.

The short circuit detecting part 21A detects the short circuit across the load 19 after the measurement results of the voltage measuring part 22A becomes the voltage value v2, and controls the switch 12 in the "OFF" condition (T3 of FIG. 12). The short circuit detecting part 21A remains in a standby mode while keeping the switch 12 as in the "OFF" condition because the short circuit still continues while the measurement result of the voltage measuring part 22A is the voltage value v2 (T4 of FIG. 12).

Here, when the short circuit of the load 19 is eliminated, the voltage measuring part 22A again measures the voltage value v1A that occurs by the internal resistance of the diode 15 and the load 19, and the constant current of the current value "is" that is supplied by the constant current supplying part 23A with respect to the forward bias direction of the diode 15. The short circuit detecting part 21A detects that the short circuit is eliminated after the measurement result of the voltage measuring part 22A returns to the voltage value v1A (T5 of FIG. 12).

The short circuit detecting part 21A controls the switch 12 to be in the "ON" condition when the short circuit is eliminated (T6 of FIG. 12).

Figure 9:
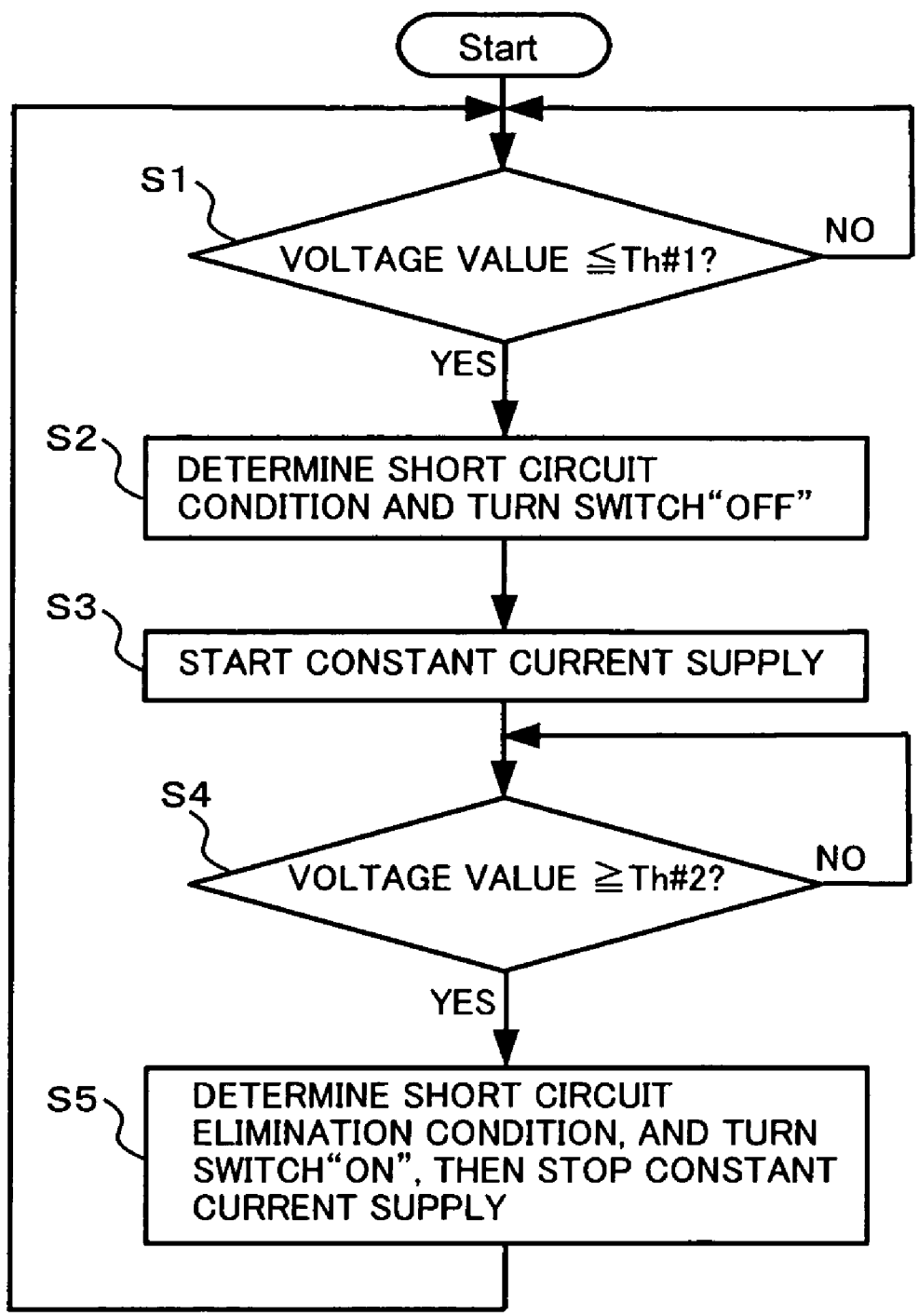
FIG. 9 is a flow diagram for showing an operation order of a power supply control device shown in FIG. 1.

A flow diagram showing an operation order of the power supply control device 20A is the same as the flow diagram showing the operation order of the power supply control device 20 except for the deletion of S3 for "start constant current supply." In other words, in the power supply control device 20A, the constant current is constantly supplied with respect to the forward bias direction of the diode 15 during operation of the power supply device 1A. Because of this, the processing of S3 of FIG. 9 is not necessary. Note that v1 shown in FIG. 4 is switched to v1A in the second embodiment. Also, v3 shown in FIG. 8 is switched to v1A in the second embodiment.

Embodiments Using IC and Program

It is explained that the power supply control device 20 is configured with three function blocks, the short circuit detecting part 21, the voltage measuring part 22, and the constant current supplying part 23; however, it can also be realized by forming one electronic circuit that has these functions in the form of an Integrated Circuit (hereafter, IC).

Alternatively, the short circuit detecting part 21, the voltage measuring part 22, and the constant current supplying part 23 of the power supply control device 20 may be configured with a general information processing device (such as a central processing unit (CPU), digital signal processor (DSP), microprocessor (microcomputer), or the like) that are operated by a predetermined program. For example, the general information processing device includes a memory, a CPU, input/output port or the like. A CPU of the general information processing device reads a control program as a predetermined program from memory or the like and executed. By doing this, functions of the short circuit detecting part 21, the voltage measuring part 22, and the constant current supplying part 23 of the power supply control device 20 are realized on the general information processing device.

The control program which is executed by the general information processing device can be stored in a memory or the like of the general information processing device either before shipment of the power supply control device 20 or after shipment of the power supply control device 20. It is also appropriate that a part of the control program is stored in the memory or the like of the general information processing device after the power supply control device 20 is shipped. The control program that is stored in the memory or the like of the general information processing device after the power supply control device 20 is shipped, for example, can be done by installing a program that is stored in a recording medium readable by a computer, such as CD-ROM, or by installing the program downloaded via a transferring medium, such as the Internet.

The control program includes a program that is directly executable by the general information processing device, but also includes a program that is executable by installing it in a hard disk. And, the program can be compressed or encrypted.

As mentioned above, since the power supply control device 20 can be made to be compact by forming it with IC or general information processing devices (CPU, DSP, microprocessor (microcomputer) or the like), it can be assembled inside of the battery pack that contains the battery 10.

Accordingly, the power supply device 1, having a compact structure which can be contained in the battery pack, stops the supply of power when an overload condition of the power supply device 1 is detected, and immediately restarts the supply of power when the overload condition of the power supply device is eliminated, can be realized.

Other Embodiments

The embodiments of the present invention can be modified in various ways so long as not to be regarded as a departure from the sprit and scope of the invention. For example, in the flow diagram of FIG. 9, the processing to determine whether or not the voltage value of S1 is equal to or less than the threshold value Th#1 may be modified to determine whether or not the voltage value is lower than the threshold value Th#1. Also, the processing to determine whether or not the voltage value of S4 is equal to or more than the threshold value Th#2 may be modified to determine whether or not the voltage value exceeds the threshold value Th#2.

Even when the constant current that is supplied by the constant current supplying part 23 according to the first embodiment constantly flows during the operation of the power supply device 1, the influence to the life of the battery 10 is small since the current value is extremely small. Therefore, the constant current supplied by the constant current supplying part 23 may constantly flow during the operation of the power supply device 1 of the first embodiment as in the second embodiment. In this case, the processing of S3, "start constant current supply," in the flow diagram of FIG. 9 is deleted.

In this case, when the short circuit of the load 19 occurs as shown in FIG. 3, the output of the voltage measuring part 22 does not become "0." In other words, when the short circuit occurs across the load 19, as the constant voltage from the constant voltage supply part 23 is supplied to the forward bias direction of the diode 15, the voltage shown in the voltage measuring part 22 is v2 (=Vt). In this case, as the current value "is" is extremely small, the relationship of "the threshold value Th#2>the threshold value Th#1" does not change.

The power supply control device, the power supply control method, the program, and the power supply device being thus described, it will be apparent that the same may be varied in many ways. Such variations are not to be regarded as a departure from the sprit and scope of the invention, and all such modifications as would be apparent to one of ordinary skill in the art are intended to be included within the scope of the following claims.

What is claimed is:

1. A power supply control device for controlling power supply to a pair of terminals to which a load is connected, comprising:
   a voltage measuring part for measuring a voltage which has a predetermined relationship with the voltage of said pair of terminals;
   a short circuit detecting part for detecting whether a short circuit exists between said pair of terminals based on the voltage measured by said voltage measuring part and for making power supply to said pair of terminals stop when existence of a short circuit is detected; and
   a constant current supplying part for supplying a constant current through said pair of terminals,
   wherein
   said short circuit detecting part is configured to detect that the previously detected short circuit is eliminated when the voltage measured by said voltage measuring part is equal to or greater than a predetermined threshold value upon said constant current supplying part supplying the constant current through said pair of terminals,
   said voltage measuring part is configured to measure the voltage across one resistance part of a voltage-dividing circuit which is connected to said pair of terminals in parallel with said load and which comprises at least two resistance parts, and
   said constant current supplying part is configured to supply said constant current through a diode which is connected in parallel to another resistance part of said voltage-dividing circuit, on which the power supplied to said pair of terminals is applied in reverse bias and which becomes in forward bias for said constant current.

2. A power supply control device for controlling power supply to a pair of terminals to which a load is connected, comprising:
   a voltage measuring part for measuring a voltage which has a predetermined relationship with the voltage of said pair of terminals;
   a short circuit detecting part for detecting whether a short circuit exists between said pair of terminals based on the voltage measured by said voltage measuring part and for making power supply to said pair of terminals stop when existence of a short circuit is detected; and
   a constant current supplying part for supplying a constant current through said pair of terminals, wherein
   said short circuit detecting part is configured to detect that the previously detected short circuit is eliminated when the voltage measured by said voltage measuring part is equal to or greater than a predetermined threshold value upon said constant current supplying part supplying the constant current through said pair of terminals,
   said constant current supplying part is configured to supply said constant current to said pair of terminals through a diode which becomes in reverse bias for the power supplied to said pair of terminals and in forward bias for said constant current aid forward bias, and
   said voltage measuring part is configured to measure the voltage at the connection point of said constant current supplying part and said diode.

3. A power supply device comprising:
   a pair of terminals to which a load is connected;
   a battery for supplying power to said pair of terminals;
   a switch for connecting and disconnecting the power supplied from said battery to said pair of terminals; and
   a power supply control device for selectively controlling said switch to disconnect when existence of a short circuit is detected between said pair of terminals, and to connect when the short circuit is eliminated, wherein
   said power supply control device comprising
   a voltage measuring part for measuring a voltage which has a predetermined relationship with the voltage of said pair of terminals,
   a short circuit detecting part for detecting whether a short circuit exists between said pair of terminals based on the voltage measured by said voltage measuring part and for making said switch disconnect power supply to said pair of terminals when existence of a short circuit is detected, and
   a constant current supplying part for supplying a constant current through said pair of terminals, wherein
   said short circuit detecting part is configured to detect that the previously detected short circuit is eliminated when the voltage measured by said voltage measuring part is equal to or greater than a predetermined threshold value upon said constant current supplying part supplying the constant current through said pair of terminals.

4. The power supply control device claimed in claim 3, wherein
   a voltage-dividing circuit comprising at least two resistance parts is connected to said pair of terminals in parallel with said load,
   said voltage measuring part is configured to measure the voltage across one resistance part of a voltage-dividing circuit,
   a diode is connected in parallel to another resistance part of said voltage-dividing circuit such that the power supplied to said pair of terminals is applied in reverse bias, and
   said constant current supplying part is configured to supply said constant current through said diode in forward bias.

5. The power supply control device claimed in claim 4, wherein
   said constant current supplying part is configured to supply said constant current to said pair of terminals through a diode which becomes in reverse bias for the power supplied to said pair of terminals and in forward bias for said constant current aid forward bias, and
   said voltage measuring part is configured to measure the voltage at the connection point of said constant current supplying part and said diode.

6. A method for controlling power supply to a pair of terminals to which a load is connected, comprising:
   measuring a voltage which has a predetermined relationship with the voltage of said pair of terminals;
   detecting whether a short circuit exists between said pair of terminals based on said voltage measured;
   making power supply to said pair of terminals stop when existence of a short circuit is detected;
   supplying a constant current through said pair of terminals; and detecting that the previously detected short circuit is eliminated when the voltage measured is equal to or greater than a predetermined threshold value upon supplying the constant current through said pair of terminals, wherein said voltage which has the predetermined relationship with the voltage of said pair of terminals is measured across one resistance part of a voltage-dividing circuit which is connected to said pair of terminals in parallel with said load and which comprises at least two resistance parts, and said constant current is supplied through a diode which is connected in parallel to another resistance part of said voltage-dividing circuit, on which the power supplied to said pair of terminals is applied in reverse bias and which becomes in forward bias for said constant current.

7. A method for controlling power supply to a pair of terminals to which a load is connected, comprising:

measuring a voltage which has a predetermined relationship with the voltage of said pair of terminals;

detecting whether a short circuit exists between said pair of terminals based on said voltage measured;

making power supply to said pair of terminals stop when existence of a short circuit is detected;

supplying a constant current through said pair of terminals; and detecting that the previously detected short circuit is eliminated when the voltage measured is equal to or greater than a predetermined threshold value upon supplying the constant current through said pair of terminals, wherein said constant current is supply to said pair of terminals through a diode which becomes in reverse bias for the power supplied to said pair of terminals and in forward bias for said constant current aid forward bias, and said voltage which has the predetermined relationship with the voltage of said pair of terminals is measured at the connection point of said constant current supplying part and said diode.

* * * * *